US010911309B2

(12) United States Patent
Defoort

(10) Patent No.: US 10,911,309 B2
(45) Date of Patent: Feb. 2, 2021

(54) COMMUNICATION SET UP PROCESS

(71) Applicant: BRITISH TELECOMMUNICATIONS PUBLIC LIMITED COMPANY, London (GB)

(72) Inventor: Steven Defoort, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 149 days.

(21) Appl. No.: 15/510,386

(22) PCT Filed: Sep. 11, 2015

(86) PCT No.: PCT/EP2015/070855
§ 371 (c)(1),
(2) Date: Mar. 10, 2017

(87) PCT Pub. No.: WO2016/041866
PCT Pub. Date: Mar. 24, 2016

(65) Prior Publication Data
US 2017/0264492 A1    Sep. 14, 2017

(30) Foreign Application Priority Data

Sep. 17, 2014   (EP) .................................... 14275192

(51) Int. Cl.
*G06F 15/16* (2006.01)
*H04L 12/24* (2006.01)
(Continued)

(52) U.S. Cl.
CPC ...... *H04L 41/0883* (2013.01); *H04L 41/0869* (2013.01); *H04L 41/5041* (2013.01);
(Continued)

(58) Field of Classification Search
CPC ............. H04L 41/0883; H04L 41/0869; H04L 41/5041; H04L 43/50; H04L 67/34;
(Continued)

(56) References Cited

U.S. PATENT DOCUMENTS 5,875,398 A * 2/1999 Snapp ................... H04W 24/00
455/424
8,804,920 B1 * 8/2014 Wageman ......... H04M 3/42365
379/88.12
(Continued)

FOREIGN PATENT DOCUMENTS

DE   10 2012 101 820   9/2013
EP        0 837 615      4/1998
EP        2 141 592      1/2010

OTHER PUBLICATIONS

International Search Report for PCT/EP2015/070855 dated Nov. 26, 2015, 3 pages.

*Primary Examiner* — Dustin Nguyen
*Assistant Examiner* — Hao H Nguyen
(74) *Attorney, Agent, or Firm* — Nixon & Vanderhye P.C.

(57) ABSTRACT

A communications terminal (10) is to be configured for operation of a new service or application by connection to a service provision platform (12) over a connection (11). In order to do this, an installation server (15) generates instructions to a user terminal (13) over a separate link (14). These instructions are used to configure the communications terminal (10) to operate the service required. The terminal (13), separate link (14) and installation server (15) are then used to monitor, over a connection (19) independent of the newly-installed connection (11), the response of the service provision platform (12) to the test transmissions sent to it from the terminal (10) over the new connection (11), and to initiate test messages from the service provision platform (12) to the communications terminal. By providing a con-
(Continued)

nection (14, 15, 19) between an installation technician (13) and the service provision platform (12) independent of the newly-installed connection (11) and newly-configured terminal (10), the behaviour of the service provision platform can be more readily understood.

12 Claims, 6 Drawing Sheets

(51) Int. Cl.
*H04L 12/26* (2006.01)
*H04L 29/08* (2006.01)
*H04L 29/06* (2006.01)

(52) U.S. Cl.
CPC .............. *H04L 43/50* (2013.01); *H04L 67/34* (2013.01); *H04L 67/42* (2013.01)

(58) Field of Classification Search
CPC . H04L 67/42; H04L 41/0806; H04L 41/0853; H04L 65/1073
USPC ........ 709/222, 224, 227, 231; 717/174, 176; 370/241, 254, 351, 352, 395.31
See application file for complete search history.

(56) References Cited

U.S. PATENT DOCUMENTS

| | | | |
|---|---|---|---|
| 2006/0080452 A1* | 4/2006 | Julia | H04L 41/0853 709/231 |
| 2007/0254634 A1* | 11/2007 | Costa-Requena | H04L 67/34 455/412.1 |
| 2008/0049623 A1* | 2/2008 | Qiu | H04L 41/0806 370/241 |
| 2008/0289012 A1* | 11/2008 | Shi | G06F 8/36 726/4 |
| 2009/0182868 A1* | 7/2009 | McFate | G06F 11/0751 709/224 |
| 2010/0100767 A1* | 4/2010 | Liu | H04L 41/0856 714/28 |
| 2013/0318352 A1* | 11/2013 | Ichikawa | H04W 12/06 713/171 |
| 2014/0310039 A1* | 10/2014 | Casey | G06Q 30/0635 705/7.13 |
| 2015/0038129 A1* | 2/2015 | Sundareswaran | H04W 24/02 455/418 |
| 2015/0262281 A1* | 9/2015 | Shaphy | G06Q 30/0631 705/26.7 |
| 2017/0111258 A1* | 4/2017 | Bezold | H04L 41/0816 |
| 2017/0264492 A1* | 9/2017 | Defoort | H04L 67/42 |
| 2019/0097872 A1* | 3/2019 | Lee | H04L 41/046 |

* cited by examiner

COMMUNICATION SET UP PROCESS

This application is the U.S. national phase of International Application No. PCT/EP2015/070855 filed Sep. 11, 2015 which designated the U.S. and claims priority to EP Patent Application No. 14275192.4 filed Sep. 17, 2014, the entire contents of each of which are hereby incorporated by reference.

BACKGROUND AND SUMMARY

This invention relates to the installation or configuration of telecommunications equipment at network terminations. Such terminations are typically located at the premises of a customer or subscriber to the telecommunications service. Typically, the installation of new equipment, or the configuration of existing equipment, is done in order to provide a new or enhanced service to the customer. It may be performed by a technician visiting the site, or by the customer following instructions supplied with the equipment or configuration software, or using guidance from remote call centre staff over a voice or data link.

The installation process can be difficult, slow and error-prone, because the customer's situations are not all alike. Differences in customer equipment, or in the services run on it, or in the network backhaul connections, may appear insignificant, but can cause unexpected behaviour when the customer equipment interacts with the network. This behaviour can be very difficult to analyse as the exact conditions cannot be replicated in an offline simulation unless the exact configuration of both the customer equipment and the connection to the network are known.

Communications systems can be extremely complex, and data and commands pass through many transformations between a server and a client or vice versa. These can include conversion between analogue and digital forms, conversion between electrical, radio and optical signals, modulation onto a carrier, compression, encapsulation, the addition of address and other header data, and diversion to a proxy server. The particular combination of processes to which a given message is subjected may lead to unintended and unpredictable consequences which are difficult to replicate or remedy without knowing the exact path the messages take, or at least knowing what one end of the link actually receives in response to a given transmission from the other.

When testing a system in the laboratory, it is of course possible to put the transmitter and receiver adjacent to each other, but this is not practical for a live telecommunications system unless there is a reliable parallel link available in order to report to one end of the link under test what is happening at the other end of the link. It would be unusual for such a parallel link to be available—and it would itself need testing when it is installed, and so on ad infinitum.

In general, it is not possible, when at the customer premises, to determine what effect a signal transmitted by a customer equipment has on the network end except by trial and error. Similarly, one can only draw conclusions about what signals are being transmitted from the network end by observing the behaviour of the customer equipment. This means that the customer or visiting technician can only use trial and error to try to correct any malfunctions in the service.

It is known, for example from United States patent application US2008/049623, to install additional test software, for example by download, onto a device to be tested, but this is only possible if the device is compatible with the test software, and also requires instructions and test results to be carried over the connection that is itself under test.

The invention provides a process in which a technician, either on site or in communication with the customer, can access signalling at the network end of the communications link during installation and testing of the new configuration, without the installation of any test equipment to the system being tested.

According to the invention, there is provided an equipment configuration system for generating configuration data for a communications terminal such that the communications terminal may co-operate with a service provision platform, the equipment configuration system comprising an installation server associated with the service provision platform and arranged to mediate interactions over a first communication link between the communications terminal and the service provision platform, and having a monitoring system for extracting, over a second communications link, data from the service provision platform relating to responses of the service provision platform to the interactions with the communications terminal.

The invention also extends to a method of configuring a communications terminal for co-operation with a service provision platform, wherein an installation server delivers instructions to configure the communications terminal to interact with the service provision platform over a first telecommunications connection, the communications terminal is configured according to the said instructions, and the installation server monitors, over a second communications connection, the response of the service provision platform to the interactions initiated by the instructions.

The equipment configuration system may have a data connection for connection to a communications terminal over which configuration data received from the service provision platform over the second communications link can be delivered to the communications terminal. It may also have a display for displaying configuration instructions received from the service provision platform over the second communications link to allow a user to implement the configuration instructions on a communications terminal. The monitoring system may extract, from the service provision platform, settings that have previously been installed to be specific to the communications terminal to be configured. The equipment configuration system may also generate test instructions the performance of which would cause the communications terminal to interact with the service provision platform over the first communications connection, with the monitoring system arranged to monitor the response of the service provision platform to the said interactions and generate further configuration data for delivery to the communications terminal in accordance with the responses detected.

A typical configuration would include a server platform and a remote terminal, connected together by a telecommunications connection, with the server platform incorporating monitoring functions, and transmitting configuration data to the remote terminal, the installation server being arranged to deliver the configuration data to the remote terminal for performance of the configuration process on the communications terminal.

The invention may be implemented in software on a computer or a plurality of computers co-operating with each other over data links.

BRIEF DESCRIPTION OF THE DRAWINGS

An embodiment of the invention will now be described by way of illustration, with reference to the Figures, in which.

DETAILED DESCRIPTION OF PRESENT EXAMPLE EMBODIMENTS

Figure 1:
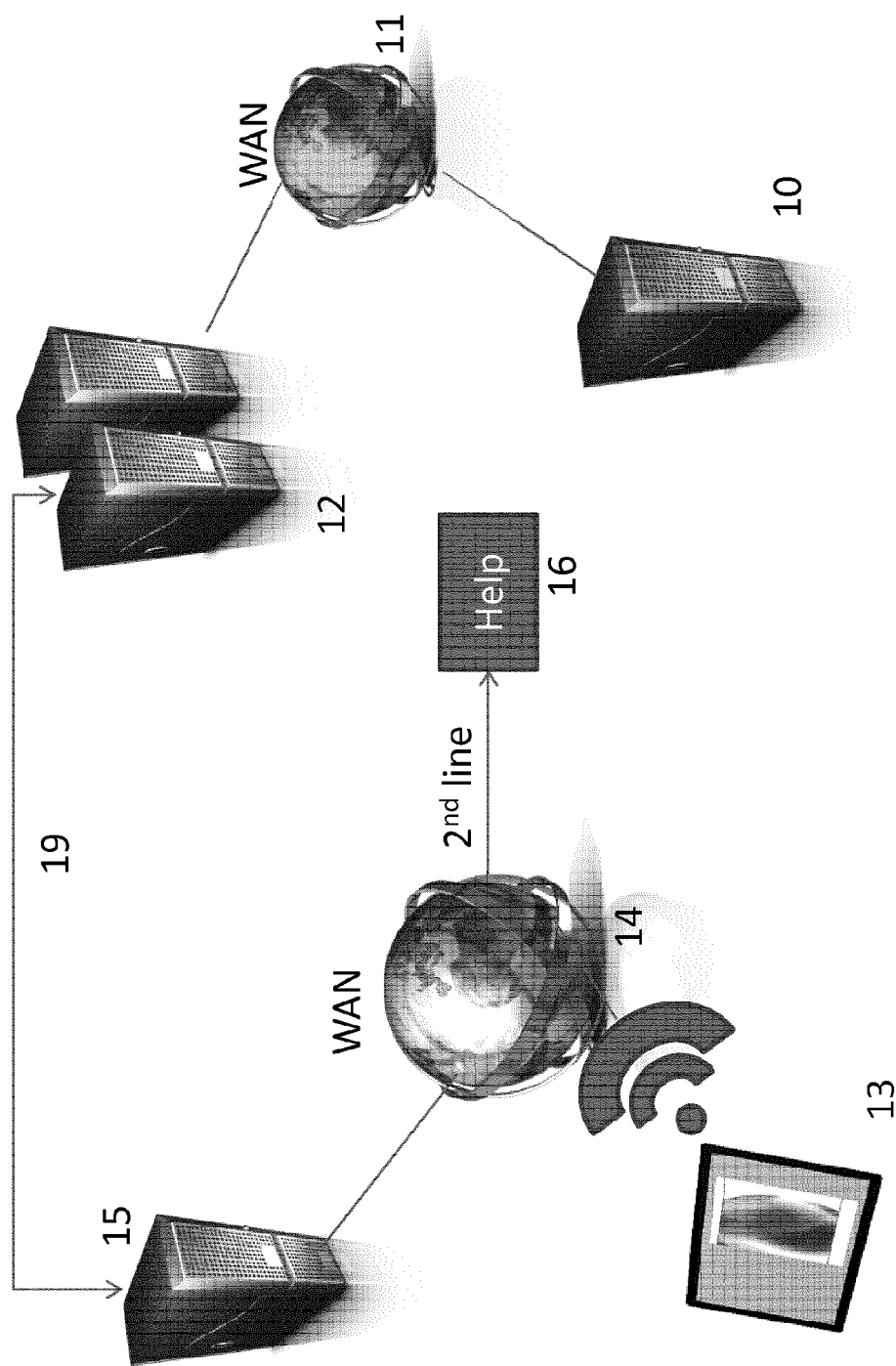
FIG. 1 is a diagrammatic representation of the network elements which cooperate to perform the invention
Figure 2:
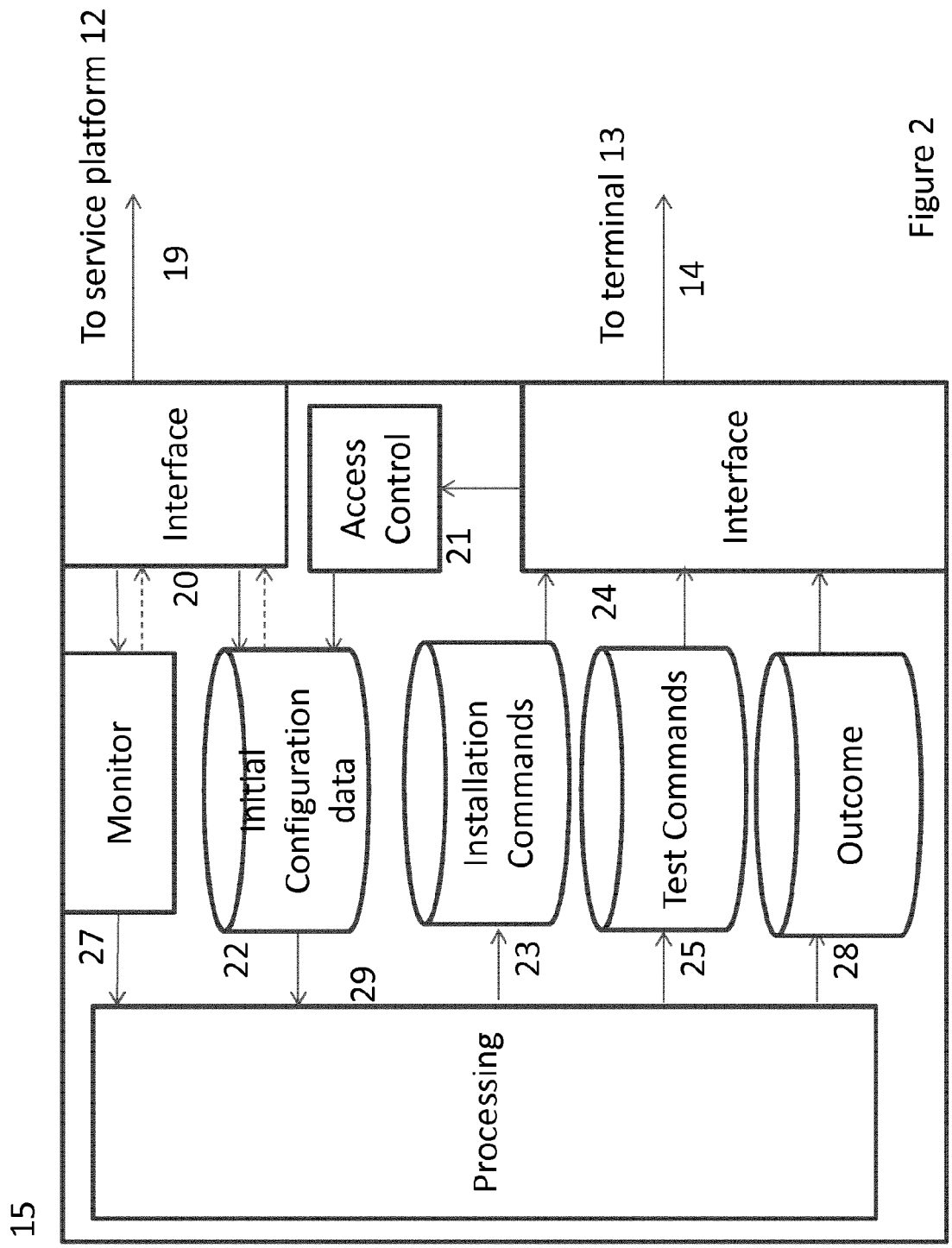
FIG. 2 is a schematic diagram of the functional elements of the installation server platform of FIG. 1
Figure 3:
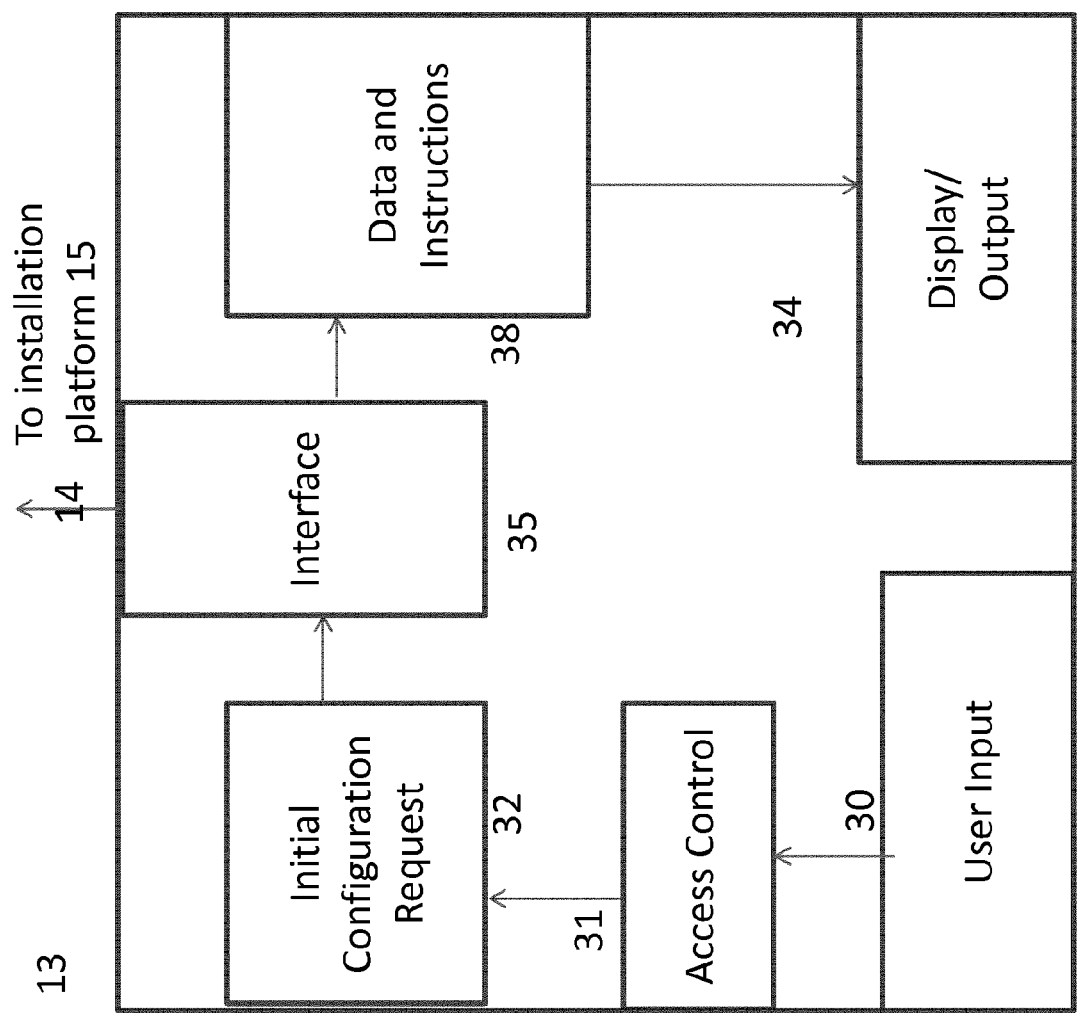
FIG. 3 is a schematic diagram of the functional elements of the installation client applications run on the user terminal depicted in FIG. 1

The elements which co-operate to perform this process are depicted in FIG. 1, and in more detail in FIGS. 2 and 3. Located at the customer premises is the customer equipment 10 which is to be configured. A (first) network connection 11 is available at the customer premises to give access to the public internet, or another communications network suitable to carrying data between a terminal 13 on the customer premises and a remote service platform 15. The network connection is illustrated as a Wireless Access Network (WAN) connecting to the core network, (not shown) but it may instead be a fixed line data connection.

A service provision platform 12 is connected to the core network so as to be accessible to the customer equipment 10 being configured through the connection 11.

The process of the invention is intended to be carried out subsequent to a subscriber (customer) arranging for a new service to be supplied by the service provider. In order to use the service some configuration is needed both in the service provision platform 12 and in equipment 13 either already on the customer premises, or provided by the service provider in advance of the service being initiated in order to enable the service to be provided. The network connection 11 may also need modification.

The service provider makes the configuration changes in the service provision platform 12 and as appropriate in the network connection 11 and then informs the customer that it is ready. Depending on the nature of the changes, these changes may be initiated in the service provision platform 12 in anticipation of the customer-end set up. However, if the new configuration is incompatible with the existing (pre-installation) set-up of the terminal equipment 10, the changes in the service provision platform 12 may need to be programmed to be switched over only in response to a signal that the user end 10 has been configured.

The user terminal 10 is then ready to be installed and configured to co-operate with the platform 12. This can be done by a technician visiting the premises and operating both the customer's terminal equipment 10 and an application running on his own terminal 13. In alternative embodiments the technician may be at a remote location, accessing the user terminal 10 over an existing communications link. In suitable circumstances a technician at a remote location may be able to send instructions over a communications link to another person (a colleague or the end-user (customer)) to perform the necessary operations on the terminal equipment 10 whilst monitoring the effect of such operations on the network, or to report the response of the terminal equipment to inputs made on his own terminal 13.

The terminal 10 may be of a type not maintained by the service provider. In such a case technicians maintaining the terminal 10 would have no access to, or visibility of, the core network and service provision platform 12 of the service provider. However, such a technician would have access, through a generally-available terminal 13 and a network connection 14, to an installation support platform 15. The installation support platform 15 provides an interface between the technician and the network-based service provision platform 12 which is to service the customer equipment 10.

The network connection 14 used by the technician's terminal 13 is depicted as being separate from the connection 11 to the customer equipment 10, but the same connection 11 may be used for both if the customer connection is working and compatible with the technician's apparatus 13, and the technician is given access permissions to use it.

In one embodiment the customer's terminal equipment 10 is controlled from the technician's terminal 13 over a data link, but in other embodiments the technician operates both terminals, following instructions received on the technician's own terminal 13.

In an alternative situation, the technician and his terminal 13 are at a location remote from the customer premises, and the technician communicates with the customer, e.g by telephone or webchat, to instruct the customer how to configure the terminal 10 or remotely accessing terminal 10 to make the changes.

The functional elements of the installation server platform 15 are depicted in more detail in FIG. 2. The functional blocks depicted therein may typically be implemented in software running on a general-purpose computer.

The platform 15 has an interface 20 with a (second) data connections 19 to the service platform 12, independent of the first data connection 11 between the service platform 12 and the user terminal 10. The platform also has an interface 24 with a (third) data connection 14 to an individual technician's terminal 13. An access control system 21 provides login and firewall facilities to prevent unauthorised access to, or interference with, the data maintained by the system, and to identify the individual customer record associated with the customer equipment 10 to be configured.

A central processor 29 is arranged to collect data from the service provision platform 12 relating to the customer installation 10 and generate messages for transmission to the technician's terminal 13. An initial configuration data store 22 collects data related to the service ordered by the customer which has been preloaded at the service platform 12. This may be done as a data "push" when the service provision platform 12 is initially configured, or as a "pull" by the data retrieval store 22 when prompted by the technician's input to the access control system 21.

A monitoring system 27 is arranged to retrieve data from the service provision platform 12 relating to the behaviour of the service platform in response to test stimuli initiated from the user equipment 10. Again, this may be done as a data "push", the service provision platform 12 having been previously set up to transmit such data to the installation platform 15, or as a data "pull" by interrogating the service provision platform 12 when a test is conducted.

The configuration and monitoring inputs 22, 27 to the processor 29 are used to generate three types of output for transmission over the downlink interface 24 to the technician's terminal 13. Firstly, there are installation commands 23, which are to be used to configure the user terminal 10.

Secondly, there are test commands, which are used to cause the user terminal 10 to interact with the service provision platform 12 so that the response of the service platform can be reported by the monitoring system 27. Thirdly, there are reports 28 which provide information to the technician. If the link between the technician's terminal 13 and the user terminal 10, is a "human in the loop" all of these outputs 23, 25, 28 may be in the form of messages to be displayed on an output of the technician's terminal 13, to be read and acted upon by the technician: e.g to tell him what controls require operation on the user terminal 10. If there is a data link between the terminals 10, 13 some of the commands 23, 25 may be in a form where they can operate the user terminal directly without human intervention.

The functional elements of the installation client platform installed on a terminal 13 are depicted in more detail in FIG. 3. The functional blocks depicted therein may typically be implemented in software running on a general-purpose computer.

The terminal 13 may be a portable computer brought to the customer premises by an installation technician, or it may be a fixed installation used by call-centre staff who are in communication with the customer at his premises.

The terminal 13 has a communications interface 35 allowing connection over a data link 14 to the installation platform 15. It also has a user input 30, e.g a keypad, and an output 34. The user input 30 is used to provide inputs from the user to an access control system 31 which is used to authenticate the technician's credentials to ensure that he has the necessary permissions to access data related to the network side of the service 12, and to identify the relevant customer and his equipment 10. This data can then be used to operate a processor 32 to generate an initial configuration request.

The user output 34 includes a means of displaying data to a human operator, and may also include a data link for connection to the user terminal 10 to be configured. Configuration data and instructions are received by the interface 35 from the installation platform 15, and processed as required 38 into a format suitable for the output or display system 34.

Figure 4:
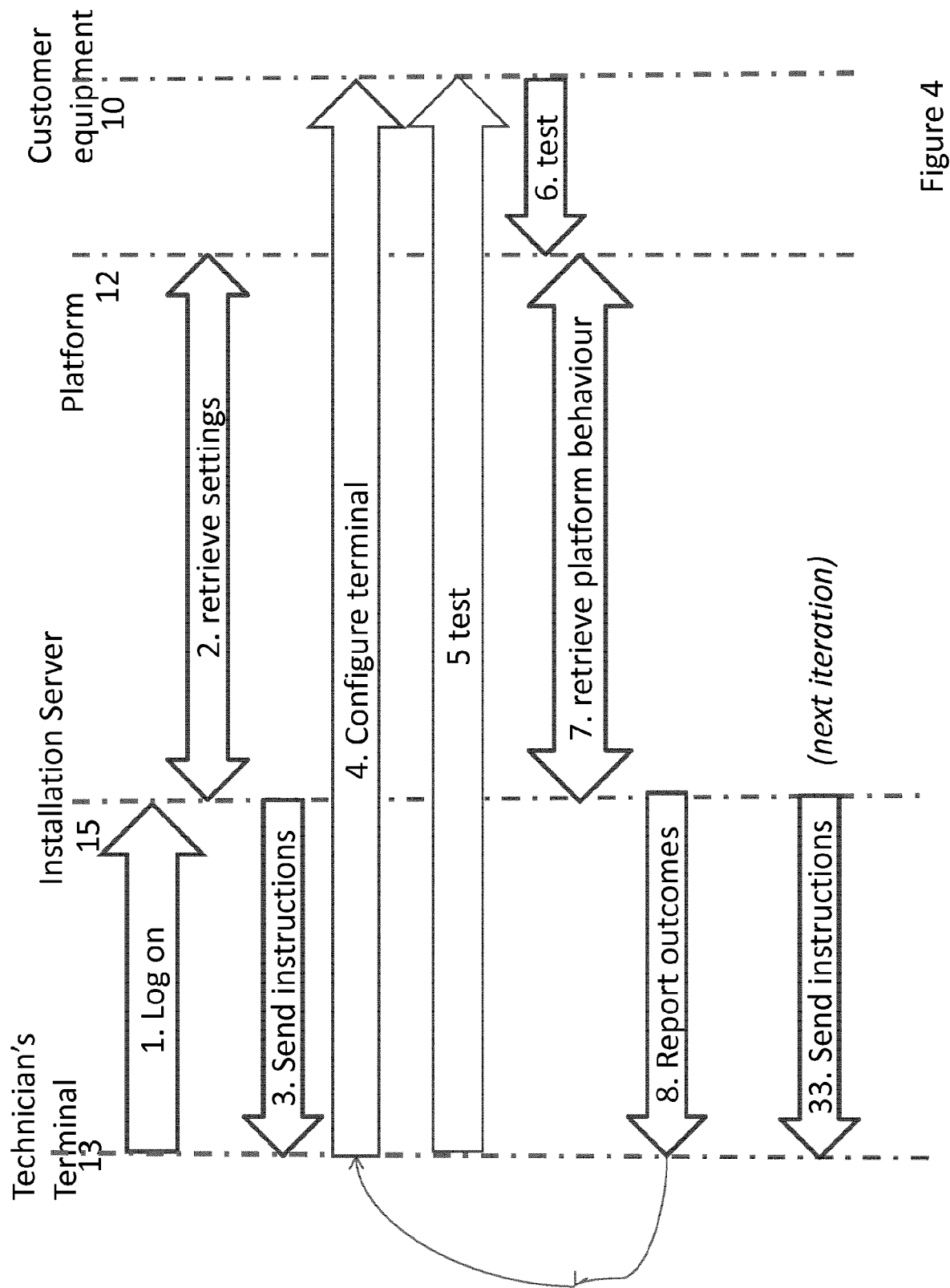
FIG. 4 is a sequence diagram indicating the interactions which take place to perform a first method according to the invention.
Figure 5:
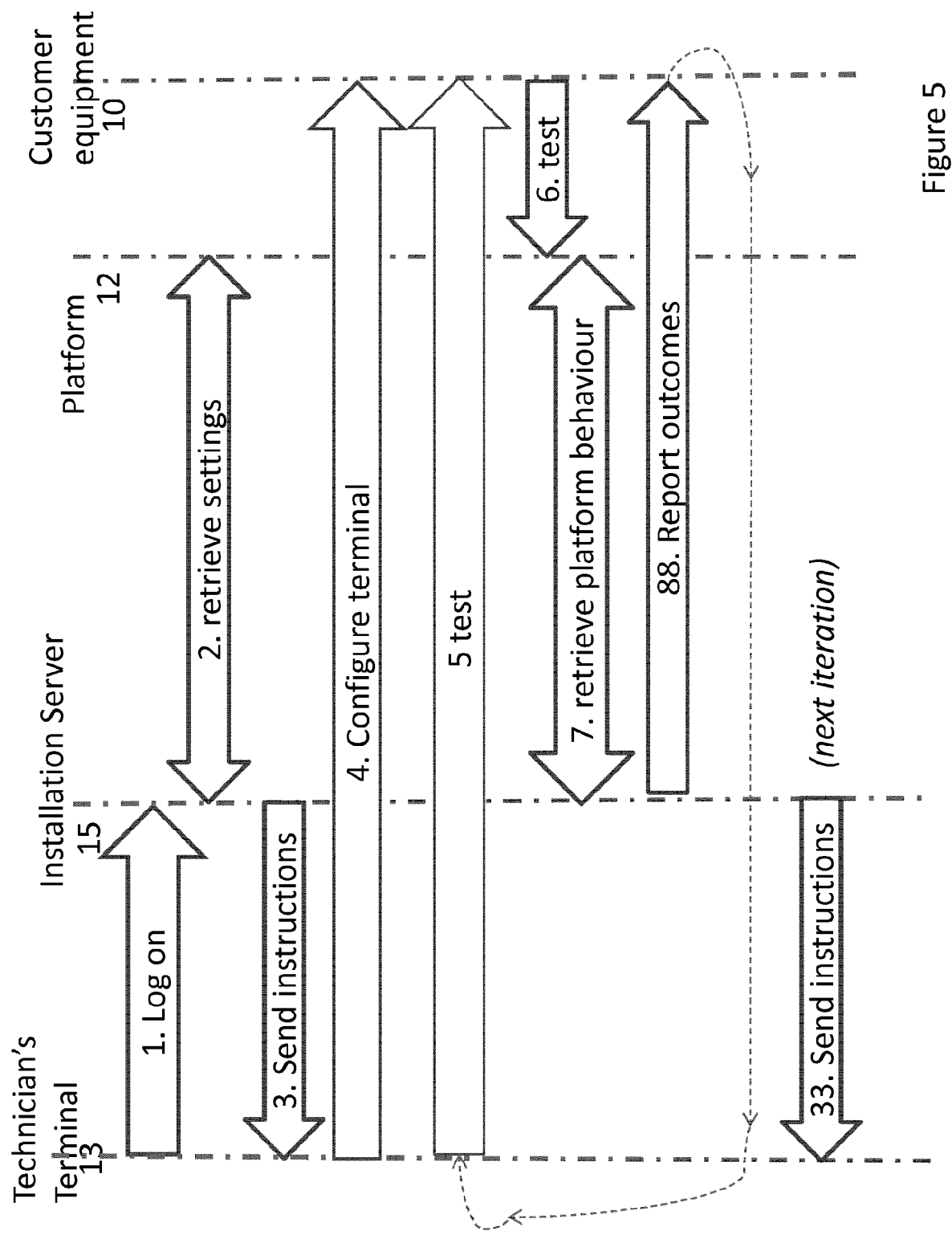
FIG. 5 is a sequence diagram indicating the interactions which take place to perform a second method according to the invention.
Figure 6:
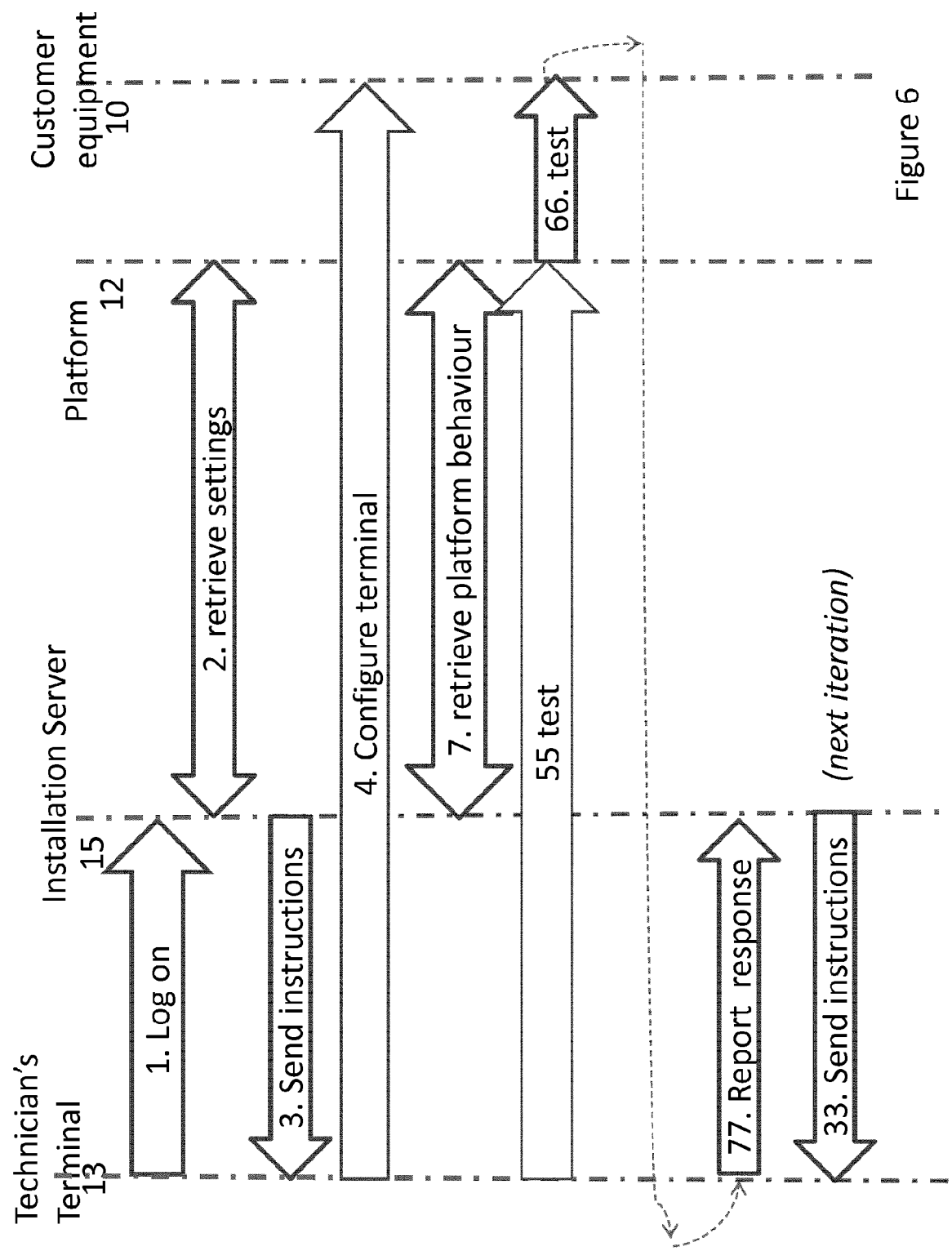
FIG. 6 is a sequence diagram indicating the interactions which take place to perform a third method according to the invention.

The process operated by these network elements is illustrated in FIGS. 4, 5 and 6. Referring first to FIG. 4, the technician first sets up a connection from the terminal 13 to the installation support server 15 through the network connection 14, following any security procedures required. (step 1).

The support technician is provided with a portable computer 13 on which the elements depicted in FIG. 3 are loaded, for example as a downloadable application. The terminal is connected over a secure link 14 to the server 15 which is itself connected to the live platform 12 for the service to be installed, and retrieves configuration information from the live platform 12 specific for the customer (IP address, ports, numbers etc). This can be used by the technician to set the equipment up, or to guide the customer to do so in a sequence of steps.

The application gives the technician visibility of what is happening in the network 12 core in response to his actions on the customer premises equipment 10, by requesting and being sent data from the server 15 linked to the network core platform 12.

Alternatively, the technician may use a standard terminal to gain access to an online web page on which these elements are operating as a "front end" to the installation platform 15.

The technician initiates a session between his terminal 13 and the server 15. The customer to be serviced is identified from the order number, account number, or network location or other relevant information, which are entered on the terminal 13 through the user input 30 and access control system 31 to generate an initial configuration request 32 and these details are transmitted to the server 15 to cause the configuration data store 22 to retrieve data that has been previously loaded in the customer-serving platform 12 when the order was placed.

The intended customer product configuration can be determined by the service provision platform 12 from the ordering process and any settings established on the platform, and retrieved by the installation platform for transmission to the field technician's terminal 13 in response to that order for display to the technician in preparation for the customer connection. This information can therefore be retrieved by any field technician who is available, rather than having to ensure a specific technician is given the relevant details when he starts his shift.

The technician downloads the application elements from the installation platform 15 to his portable computer 13 and enters an identifier, provided by the service provider, to identify the customer installation to be tested. The access control system 31 causes the request system 32 to generate an initial request which is sent to the installation platform 15. Data defining configuration steps and guidance appropriate to this particular customer are retrieved from the store installation command store 23 in the installation platform, which so identifies which parts of the service provision platform 12 are allocated to the service to be provided, and thus need to be monitored by the monitoring system 27 during the tests to be carried out.

The server 15 transmits a list of configuration instructions to the processor 38 on the technician's terminal 13 to generate a display 34 to guide the technician, or the user under the guidance of the technician, to carry out the steps necessary to configure the customer equipment 10 to interact correctly with the customer-facing platform (step 3). In this embodiment, it is assumed these configuration steps involve manual setting of the terminal 10 (step 4), but it may be done using a data link (not shown) between the technician's own terminal 13 and the customer equipment 10, or operating appropriate controls on the customer-end apparatus to set it up correctly to run the rest of the process.

Having carried out these instructions, the technician's terminal then generates prompts to instruct the technician to perform tests (step 5) to check that the operation has been successful and the configuration has been performed correctly.

These tests cause the terminal equipment 10 to interact with the service provision platform 12 (step 6).

In prior art systems, the effect of any such tests on the customer-serving platform 12 can only be deduced from the responses received from the service provision platform 12 by the customer-facing equipment 10. In such situations it can be difficult to determine what the service provision platform 12 is doing, as its behaviour is being monitored through the customer terminal which is itself under test. In the present invention, the behaviour of the service provision platform 12 in response to test signals 6 sent from the terminal equipment 10, and vice versa, is monitored by the mentoring function 27 of the installation support server 15, (step 7) and the results reported to the reporting function 28 for transmitting to the technician 13 (step 8) or, as shown in FIG. 5, back to the customer equipment 10 (step 88). The technician therefore has visibility of both ends 10, 12 of the client/server link 11.

For example the prompt may instruct the technician (or customer) to use the customer equipment 10 (step 5) to call a telephone number allocated to the server 15. Once the call is connected through the service provision platform 12 (step 6), the server 15 records the incoming voice call (step 7) and can play a pre-recorded response back over the connection to the customer equipment 10 (step 88) or to the technician's terminal 13 (step 8).

The monitoring function 27 can use protocol capture for test calls made with intelligence added to highlight errors, or deviations from the expected signalling. Such errors and deviations can then be identified, and further instructions generated by the installation command system 23 to be transmitted to the technician terminal 13 to amend the configuration of the user terminal 10 to rectify those errors.

The technician can therefore use the terminal 13 to interrogate the installation platform 15 to get feedback in real time (step 8, 88) as he executes the configuration steps 4 on the equipment, and determine the result of those configuration steps 4 or tests 5 made after or during installation. If necessary, the technician can use a second communications link to contact a support desk 16 to resolve any issues that cannot be rectified from the customer end, for example if a component at the exchange or service provision platform 12 is faulty, requiring the customer line 11 to be re-allocated to a different connection.

The tests to be made will depend on the type of service being installed. For example, for voice or video, the application would initiate a test call, using recorded audio, DTMF listening or simulation as appropriate for the testing to simulate an incoming call. The application can serve as an answering point (again using with recorded audio, DTMF, etc) to answer the outgoing test call. The tests carried out on the customer equipment 10 cause it to interact with the customer-facing platform 12 in a predetermined way (step 6).

As shown in FIG. 6, tests may also be made by transmitting a command 55 from the technician's terminal 13 to the service provision platform 12 to cause the service provision platform 12 to make a call 66 to the customer equipment 10, for example playing a pre-recorded voice. The technician listens to the incoming call on the customer equipment 10, and determines whether it has come through correctly, reporting the outcome to the server 15 using his terminal 13 (step 77). Various call types can be tested, such as making and receiving long duration calls, calls to cellular terminals, international calls, calls to short codes e.g emergency 999/112/911, calls not answered or diverted, etc.

The technician can submit the test results to a separate reporting centre 16 or to the service provider platform 15. If the technician is working in a call centre, rather than on site, a separate telephone line would be provided to talk through the process with the user, or a video link to allow the technician to see what the customer can see.

The server platform 15 can also transmit further instructions (step 33) to the technician in response to the outcomes 7 reported, and the configuration (step 4), test (steps 5/55, 6/66), report (steps 7/77; 8/88) iterate as often as is necessary. In the event that the behaviour of the client/server system 10, 12 cannot be resolved by the iterative process, the technician 13 also has access through the network connection 14 to further assistance 16, which may also provide access to the data received and processed by the installation support platform 15, and may also have access rights to reconfigure the service provision platform 12 should that be necessary to resolve the issue, and then repeat the testing procedure as many times as necessary to resolve the problem. This allows tests to be run iteratively during the configuration process.

What is claimed is:

1. An equipment configuration system for mediating a configuration process for configuring a first communications connection between a communications terminal and a service provision platform with which it is to co-operate, the equipment configuration system comprising:
   an installation server, associated with the service provision platform and including a computer processor, the installation server being configured to mediate interactions between the communications terminal and the service provision platform over the first communications connection;
   a second communications connection configured to deliver configuration information from the service provision platform to the installation server to allow configuration of the communications terminal, the second communications connection being independent of the first communications connection; and
   a remote terminal and a third communications connection, the third communications connection being independent of the first and second communications connections, and the third communications connection being configured to communicate information between the remote terminal and the installation server; wherein
   the installation server is configured to:
      receive the configuration information from the service provision platform;
      deliver configuration instructions derived from the configuration information to the remote terminal over the third communications connection;
      generate test instructions, performance of which subsequent to configuration of the communications terminal based on the configuration instructions cause the communications terminal to perform interactions with the service provision platform over the first communications connection;
      monitor responses of the service provision platform to the interactions over the second communications connection including extracting, over the second communications connection, data from the service provision platform relating to responses of the service provision platform to the interactions with the communications terminal; and
      generate further instructions for delivery to the remote terminal over the third communications connection in accordance with the monitored responses for display at the remote terminal to allow reconfiguration of the communications terminal in accordance with the monitored responses.

2. The equipment configuration system according to claim 1, wherein the remote terminal is configured to display the configuration instructions derived from the configuration information received from the service provision platform over the second communications connection to allow a user to implement the configuration instructions on the communications terminal.

3. The equipment configuration system according to claim 1 wherein the monitoring includes extracting, from the service provision platform, the configuration information specific to the communications terminal to be configured.

4. A method of configuring a communications terminal for co-operation with a service provision platform, the method comprising:

delivering configuration information to configure the communications terminal to enable interactions to take place between the communications terminal and the service provision platform over a first communications connection, the configuration information being delivered to an installation server over a second communications connection, the second communications connection being independent of the first communications connection;

associating the installation server with a remote terminal, capable of communication with the installation server over a third communications connection, the third communications connection being independent of the first and second communications connections;

transmitting, using the installation server, configuration instructions derived from the configuration information to the remote terminal for display at the remote terminal;

generating, by the installation server, test instructions for controlling the communications terminal such that the communications terminal performs interactions with the service provision platform over the first communications connection, subsequent to configuration of the communications terminal based on the configuration instructions;

monitoring by the installation server over the second communications connection responses of the service provision platform to interactions initiated by the configuration instructions; and generating further instructions for delivery to the remote terminal over the third communications connection, for display at the remote terminal to allow reconfiguration of the communications terminal in accordance with the monitored responses.

5. The method according to claim 4, further comprising:
the installation server generating in response to the monitored responses further instructions to configure the communications terminal to generate further interactions.

6. The method according to claim 4, wherein said transmitting the configuration instructions comprises delivering the configuration instructions over the third communications connection from the installation server to the remote terminal.

7. The method according to claim 4, further comprising:
displaying the configuration instructions to a user for manual configuration on the communications terminal.

8. The method according to claim 4, wherein delivering configuration information from the service provision platform to the installation server comprises delivering configuration information specific to the communications terminal to be configured.

9. The method according to claim 4, wherein:
the method further comprises displaying the configuration instructions on the remote terminal;
the displaying of the configuration instructions is performed on a human interface on the remote terminal; and
manual configuration is performed on the communications terminal by manual input using a human interface on the communications terminal.

10. A computer server for mediating a configuration process for a communications terminal, by mediating interactions between the communications terminal and a service provision platform over a first communications connection such that the communications terminal is arranged to cooperate with the service provision platform over the first communications connection, the computer server comprising:

a second communications interface configured to receive configuration information from the service provision platform to allow configuration of the communications terminal;

a third communications interface configured to communicate configuration information from the computer server to a remote terminal; and a processing system, including memory storing instructions and a computer processor for executing the instructions;

the computer server being at least configured to:
receive the configuration information from the service provision platform using the second communications interface;

derive configuration instructions based on the configuration information and extracted data;

deliver the configuration instructions to the remote terminal using the third communications interface;

generate test instructions, performance of which subsequent to configuration of the communications terminal based on the configuration instructions cause the communications terminal to perform interactions with the service provision platform over the first communications connection;

monitor, using the second communications interface, the responses of the service provision platform to the interactions including extracting, using the second communications interface, data from the service provision platform relating to responses of the service provision platform to the interactions with the communications terminal; and generate further instructions for delivery to the remote terminal using the third communications interface remote for display at the remote terminal to allow reconfiguration of the communications terminal in accordance with the monitored responses.

11. The computer server according to claim 10, wherein the configuration instructions delivered to the remote terminal are such that the remote terminal displays the configuration instructions to allow a user to implement the configuration instructions on the communications terminal.

12. The computer server according to claim 10 wherein the processing system is further configured to extract, from the service provision platform, the configuration information specific to the communications terminal to be configured.

* * * * *